United States Patent [19]
Gilmore

[11] Patent Number: 5,803,439
[45] Date of Patent: Sep. 8, 1998

[54] APPARATUS AND METHOD FOR REDUCING SHOCKS IN A LINE

[76] Inventor: Peter Gilmore, 360 Newbury St., Boston, Mass. 02115

[21] Appl. No.: 708,266

[22] Filed: Sep. 6, 1996

Related U.S. Application Data

[60] Provisional application No. 60/003,283 Sep. 6, 1996.

[63] Continuation-in-part of Ser. No. 527,791, Sep. 13, 1995, abandoned, which is a continuation of Ser. No. 248,969, May 25, 1994, abandoned.

[51] Int. Cl.$^6$ ....................................................... F16F 1/00
[52] U.S. Cl. .............................................................. 707/74
[58] Field of Search ............................... 267/73, 74, 109, 267/174, 179; 119/205, 215, 216

[56] References Cited

U.S. PATENT DOCUMENTS

| | | | |
|---|---|---|---|
| 1,690,957 | 11/1928 | Tommins | 267/74 |
| 2,593,940 | 4/1952 | Van Meter | 267/74 |
| 2,802,269 | 1/1957 | Wolff | 267/74 |
| 3,306,600 | 2/1967 | Roux et al. | 267/74 |

*Primary Examiner*—Lee W. Young
*Attorney, Agent, or Firm*—Brian M. Dingman

[57] ABSTRACT

An apparatus and method for reducing shocks in a line connecting two objects is disclosed. The apparatus comprises a housing and a resilient member within the housing. The shock absorbing apparatus is incorporated into the line on which it will be used with flexible cables coupled to the resilient member and extending out of the housing. The line may be coupled to the shock absorbing apparatus by means of a restriction tube and is then connected to the two objects.

12 Claims, 10 Drawing Sheets

APPARATUS AND METHOD FOR REDUCING SHOCKS IN A LINE

CROSS REFERENCE TO RELATED APPLICATIONS

This application is a continuation in part of U.S. application Ser. No. 08/527,791, filed Sep. 13, 1995, now abandoned, which is a file wrapper continuation of U.S. application Ser. No. 08/248,969, filed May 25, 1994 now abandoned, and also U.S. Provisional Application No. 60/003,283, filed Sep. 6, 1995.

FIELD OF THE INVENTION

This invention relates generally to an apparatus and method for reducing shocks in a line connected between two objects, and more particularly concerns an apparatus and method as recited above that is adaptable for use in a multitude of applications such as boat mooring, water skiing, boat towing, aircraft tie down lines and rescue lines.

BACKGROUND OF THE INVENTION

The problem of shock absorption between two objects connected by a line has plagued industries such as boating and aviation for many years. Line herein is used to encompass marine line, rope, chain, cable and other similar material for securing two objects together. Shocks, jerks, surges and other such occurrences create many problems such as line chaffing, as well as excessive bouncing and rolling of a boat, aircraft or other object. These problems can result in substantial damage to the boat, aircraft or other object, it also creates a safety hazard to people on or near the boat, aircraft and/or other object.

There have been various attempts in the prior art to reduce the shock in a line and thus eliminate the resultant problems. U.S. Pat. No. 4,681,303 to Grassano discloses a shock absorbent connector for use with vehicle tow lines, tie down lines for aircraft, mooring lines for boats, and the like. The disclosed connector uses an internal spring that is compressed by a piston as force is applied to one end of the spring. The connector however, is merely a shock absorbing connector and not a device for application directly to one individual line. The disclosure requires two separate lines to utilize the device. This requirement creates additional costs for using the device and it inconveniences the user. Furthermore, the amount of compression force applied to the connector is virtually unlimited thus increasing the likelihood that the device will break. If the disclosed connector should consequently break, the two lines would no longer be connected, thus creating a variety of dangerous situations, especially when mooring a boat, pulling a water-skier, securing an aircraft or operating rescue apparatus.

U.S. Pat. No. 4,864,956 to Oustwedder discloses a yieldable mooring line for a boat. Such a line fully exposes the disclosed springs to marine growth such as barnacles, mussels, and the like, that can substantially impair the effectiveness of the line. The disclosure also suffers the same problems as Grassano in that it requires at least two separate lines to make one connection across the springs.

U.S. Pat. No. 4,955,309 to Ciccone discloses a yieldable line assembly and in line shock absorber. Similar to Grassano, this reference discloses a plunger that compresses a spring in response to compression force from a line. A second end of the device is serially connected to another line. Because of the design, Ciccone thus suffers from the same problems as those noted with Grassano and Oustwedder.

A further problem encountered with the prior art is the need to tie the line to the shock absorbing device. Because of the high amount of tension put on the line and knots by the environments in which they are used, the line must be cut to remove the shock absorbing device from the line.

There have been other attempts in the prior art to solve the same problems addressed by the above noted references. Many of those other attempts, however, have been characterized as being highly corrosive, having unduly complicated and costly designs, being unreliable and consequently dangerous, and being unable to adapt to varying degrees of stress in a line and the elements.

Accordingly there is a great need for a device and method that will absorb shocks in a single line connected between two objects, without the need for tying knots, where the device has a simple design which consequently is inexpensive to manufacture and is characterized by its functional and structural reliability.

SUMMARY OF INVENTION

It is therefore an object of this invention to provide an apparatus and method for reducing and/or absorbing the shocks in a line connecting two objects.

It is another object of this invention to provide an apparatus and method for reducing line chaffing and excessive bouncing of an object that is connected to another object by a line.

It is another object of this invention to provide an apparatus and method for reducing the shocks in a line that is simple and inexpensive to manufacture and implement.

It is another object of this invention to provide an apparatus and method for reducing shocks in a line that is structurally strong, versatile in its load potentials, will not corrode too rapidly, is not exposed to substantial marine growth in its use and is characterized by its reliability.

It is another object of this invention to provide an apparatus and method for reducing shocks in a line that is adapted specifically to be utilized on a single line.

It is another object of this invention to provide an apparatus and method for reducing shocks in a line that is able to be adapted to be used for a variety of applications including but not limited to: mooring a boat; towing a boat; pulling a water-skier; tying down an aircraft; and using rescue lines.

It is another object of this invention to provide an apparatus and method for reducing shocks in a line that increases the personal safety of people on a boat or other objects that may be connected by that line.

It is another object of this invention to provide an apparatus for reducing shocks in a line which may be incorporated into a line without the need for tying knots in the line.

This invention results from the realization that a resilient spring can be fastened to two points on a single line connected between two objects and thus provide a reliable and simple shock absorption function. The points at which the line is fastened are formed with flexible cables which also couple the resilient spring to the line. The resilient spring is contained within a housing to prevent substantial marine growth from forming on the spring, thus increasing the reliability and longevity of such an apparatus.

The above and other objects are achieved in accordance with the present invention which, according to a first aspect, provides an apparatus for reducing shocks in a line. The apparatus comprises a resilient member disposed within a housing. A first flexible cable coupling a line receiving means to the resilient member is located at the first end of the housing. Similarly, a second flexible cable coupling a second line receiving means to the resilient member is located at the second end of the housing. At the first end of the housing is a first stop element to prevent the first line receiving means from being pulled into the housing by the resilient member. Similarly, at the second end of the housing is a second stop element to prevent the second line receiving means from being pulled into the housing by the resilient member.

A second aspect of the invention is comprised of an elongated housing inside of which is a spring. At the first end of the elongated housing is a first end cap, similarly at the second end of the elongated housing is a second end cap. At the first end of the elongated housing, a flexible cable is passed around the spring, out of the housing through one hole in the first end cap, back inside the housing through a second hole in the first end cap and is secured to the beginning portion of the flexible cable thereby forming a line receiving loop outside the elongated housing and a securing loop inside the elongated housing. A similar flexible cable is positioned at the second end of the elongated housing. A securing cable is passed through both of the securing loops and fastened such that it forms a continuous loop around the spring. This securing cable will limit the extent to which the spring is allowed to expand. This securing cable will also maintain the integrity of the device in the event the spring should break.

A third aspect of the invention provides a method for incorporating a shock absorbing device into a line easily and without the need to tie the line to the shock absorbing device. The method is accomplished by providing a shock absorbing device with two spaced line receiving means and a restriction tube. The line is passed through one line receiving means, then through the restriction tube, and then back through the other line receiving means. The ends of the restriction tube are designed to grab the line receiving means, thereby securing the shock absorbing device into the line, and providing a predetermined amount of slack in the line between the two ends of the shock absorbing device. The two ends of the line are then tied to the objects which are being connected.

BRIEF DESCRIPTION OF THE DRAWINGS

Other objects, features and advantages of this invention will occur to those skilled in the art from the following description of a preferred embodiment and the accompanying drawings in which.

DETAILED DESCRIPTION OF THE PREFERRED EMBODIMENT

Figure 1:
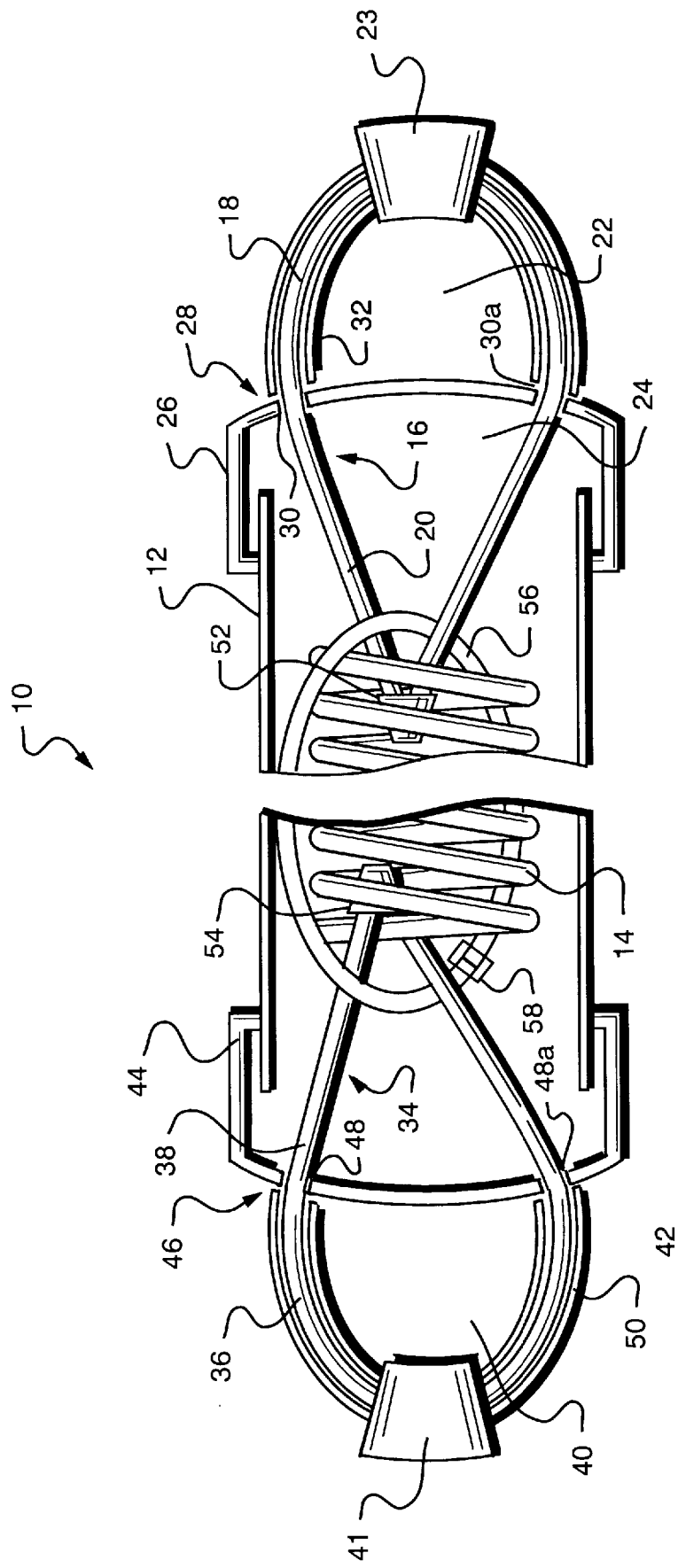
FIG. 1 is a side view, in partial cross section, of a preferred embodiment of the apparatus of this invention.
Figure 2:
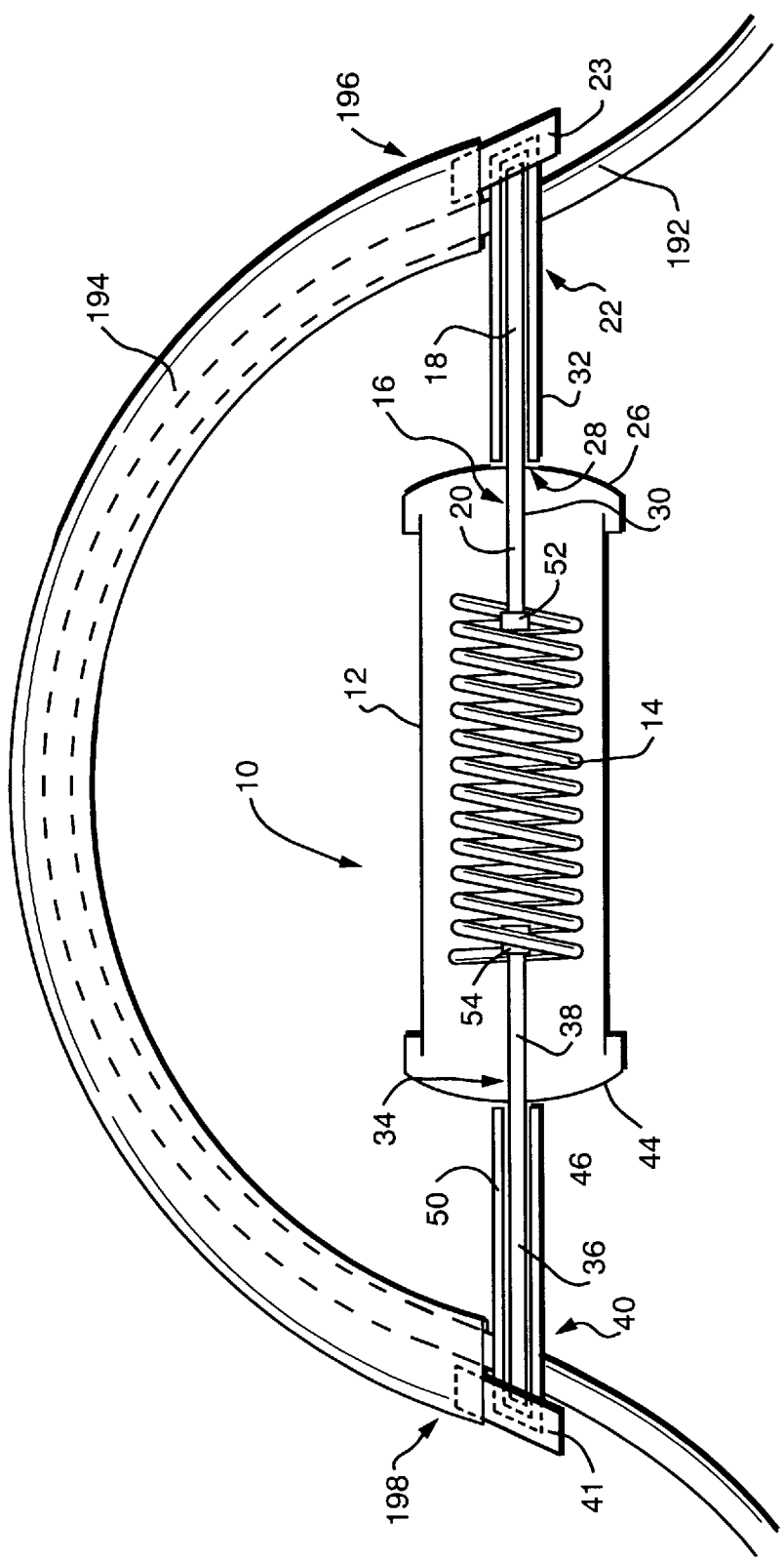
FIG. 2 is a side view, in partial cross section, of the apparatus of FIG. 1 with a preferred embodiment of the restriction tube of this invention.

FIGS. 1 and 2 show a detailed view in partial cross section of a preferred embodiment of an apparatus for reducing shocks in a line according to this invention, hereinafter referred to as the shock absorber 10. The shock absorber 10 comprises an external housing 12 inside of which is a spring 14. Positioned at the first end of the housing 12 is a first end cap 26 through which passes a first flexible cable 16. The first flexible cable 16 passes through a first hole 30 in the first end cap 26, has a portion 18 located outside the housing 12, then passes back into the housing 12 through a second hole 30a in the first end cap 26. The first flexible cable 16 then loops around the first end of the spring 14 to couple the first end of the spring 14 to the first flexible cable 16. The ends of the first flexible cable 16 are secured together with a coupling 52 such that the first flexible cable 16 forms a continuous loop with a portion 20 located inside the housing 12 and a portion 18 located outside of the housing 12. The coupling 52 may be a coupling, crimp or other like securing apparatus. The ends of the first flexible cable 16 and the coupling 52 form a V around the spring 14, preventing bending of the first flexible cable 16 at the point it is secured to the spring 14. A further advantage of the V shape is that it reduces the friction between the first flexible cable 16 and the spring 14. The outside portion 18 of the first flexible cable 16 is surrounded by a first flexible sheath 32. The combination of the first flexible sheath 32 and the holes 30 and 30a through the first end cap 26, create a first stop element 28 as the outside diameter of the first flexible sheath 32 is wider than the diameter of the holes 30 and 30a in the first end cap 26. The first stop element 28 thus prevents the outside portion 18 of the first flexible cable 16 from being pulled inside the housing 12 by the spring 14. The outside portion 18 of the first flexible cable 16 surrounded by the sheath 32 defines an opening referred to as a first receiving loop 22. At the distal end of the first receiving loop 22 is a first gripping member 23 which surrounds both the first flexible sheath 32 and the outside portion of the first flexible cable 18. The inside portion 20 of the first flexible cable 16 defines an opening referred to as a first securing loop 24.

Positioned at the second end of the housing 12 is a second end cap 44 through which passes a second flexible cable 34. The second flexible cable 34 passes through a first hole 48 in the second end cap 44, has a portion 36 located outside the housing 12, then passes back into the housing 12 through a second hole 48a in the second end cap 44. The second flexible cable 34 then loops around the second end of the spring 14 to couple the second end of the spring 14 to the second flexible cable 34. The ends of the second flexible cable 34 are secured together with a coupling 54 such that the second flexible cable 34 forms a continuous loop with a portion 38 located inside the housing 12 and a portion 36 located outside of the housing 12. The ends of the second flexible cable 34 and the coupling 54 form a V around the spring 14, preventing bending of the second flexible cable 34 at the point it is secured to the spring 14. A further advantage of the V shape is that it reduces the friction between the second flexible cable 34 and the spring 14. The coupling 54 may be a coupling, crimp or other like securing apparatus. The outside portion 36 of the second flexible cable 34 is surrounded by a second flexible sheath 50. The combination of the second flexible sheath 50 and the holes 48 and 48a through the second end cap 44, create a second stop element 46 as the outside diameter of the second flexible sheath 50 is wider than the diameter of the holes 48 and 48a in the second end cap 44. The second stop element 46 thus prevents the outside portion 36 of the second flexible cable 34 from being pulled inside the housing 12 by the spring 14. The outside portion 36 of the second flexible cable 34, surrounded by the second flexible sheath 50, defines an opening referred to as a second receiving loop 40. At the distal end of the second receiving loop 40 is a second gripping member 41 which surrounds both the second flexible sheath 50 and the outside portion of the second flexible cable 34. The inside portion 38 of the second flexible cable 34 defines an opening referred to as a second securing loop 42.

Located inside the housing 12 is a securing cable 56 which passes through the first securing loop 24, around the spring 14 and through the second securing loop 42. The ends of the securing cable 56 are secured with a coupling 58 such that the securing cable 56 forms one continuous loop. The purpose of the securing cable 56 is to limit the distance which the spring 14 is allowed to stretch.

FIG. 2 shows the shock absorbing device 10 of FIG. 1 in conjunction with a line 192 and a restriction tube 194. The line 192 in which the shock absorber 10 will be incorporated is passed through the first receiving loop 22, then through the restriction tube 194, and finally back through the second receiving loop 40. The first end 196 of the restriction tube 194 is cut at an angle to allow it to rest flat against the first flexible sheath 32 around the first receiving loop 22. The first end 196 of the restriction tube 194 rests over the first gripping member 23. This allows the restriction tube 194 to rest securely on the first receiving loop 22. The second end 198 of the restriction tube 194 is cut at an angle to allow it to rest flat against the second flexible sheath 50 around the second receiving loop 40. The second end 198 of the restriction tube 194 rests over the second gripping member 41. This allows the restriction tube 194 to rest securely on the second receiving loop 40. The use of the restriction tube 194 allows for the incorporation of the shock absorber 10 into the line 192 without the need for tying knots to the first 22 and second 40 receiving loops. A further advantage of the restriction tube 194 is that it allows for a predetermined amount of slack in the line 192 to be positioned between the first 22 and second 40 receiving loops, thereby limiting the maximum extension which the shock absorber 10 will be allowed to perform.

Figure 3:
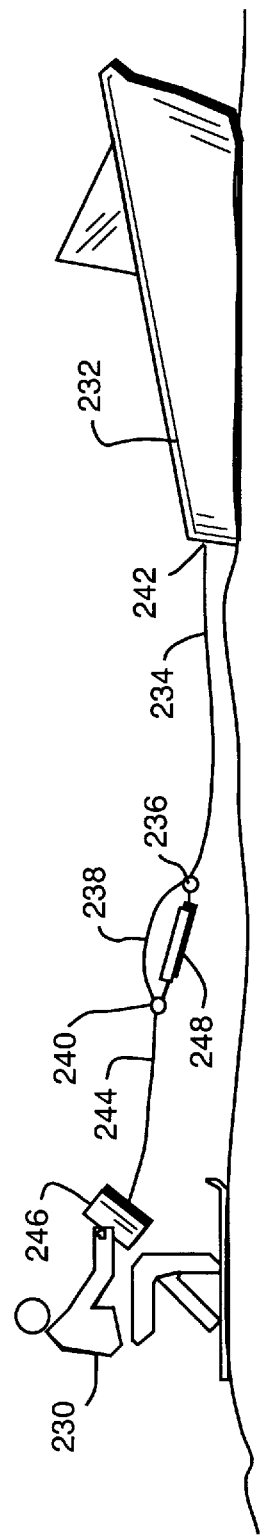
FIG. 3 illustrates a method of using the apparatus of this invention in conjunction with a boat and water-skier.

FIGS. 3, 4, 5, 6 and 7 are illustrative of several methods for using the apparatus of the present invention. FIG. 3 shows a water-skier 230 being pulled by a boat 232 with a line 234 connected therebetween. The line 234 passes through the first receiving loop 236, then through the restriction tube 238 and finally back through the second receiving loop 240. The first end 242 of the line 234 is secured to the boat 232 while the other end 244 is secured to a device 246 for the water skier 230 to grasp. The shock absorber 248 is thereby secured between the boat 232 and the water-skier 230 and reduces the severity of the shocks in the line 234.

Figure 4:
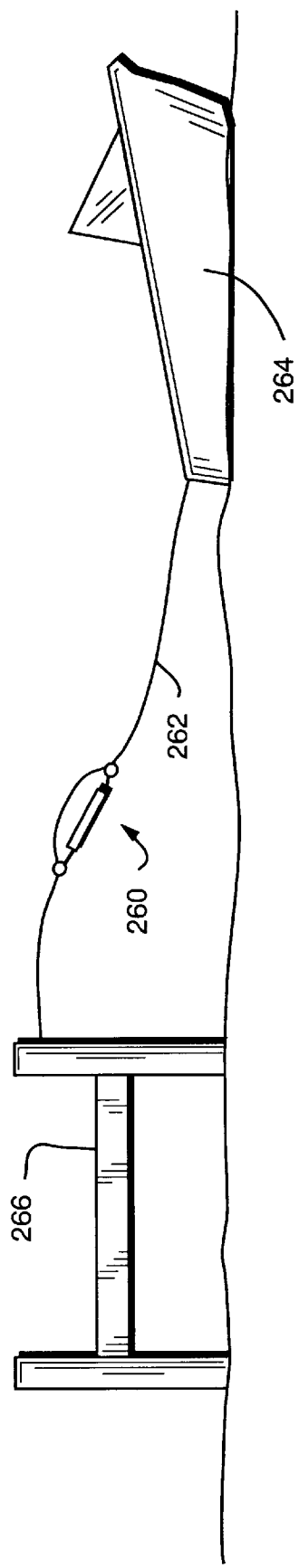
FIG. 4 illustrates a method of using the apparatus of this invention in conjunction with a boat and a dock.

FIG. 4 similarly illustrates another method and use of the shock absorber 260 of this invention in conjunction with a line 262. In this configuration a boat 264 is secured to a dock 266 with a line 262 connected therebetween. The shock absorber 260 is incorporated into the line 262 in similar fashion as has been described above. The use of the shock absorber 260 in this environment reduces the stress placed on the line 262, boat 264 and the dock 266 created by wind, waves and other like occurrences.

Figure 5:
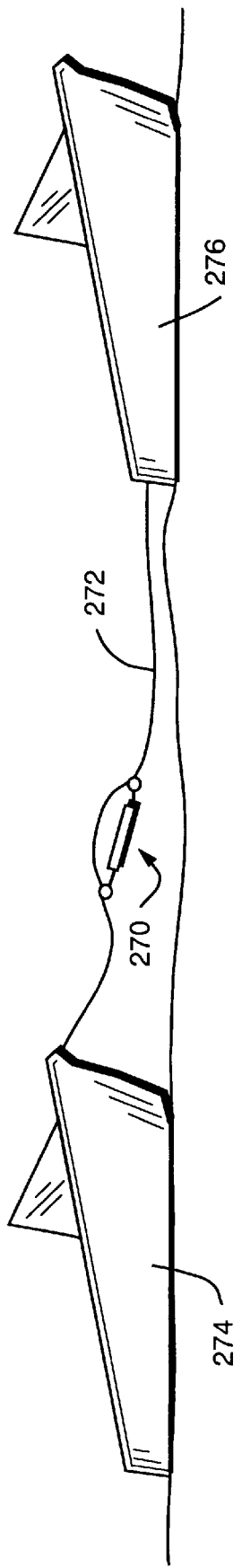
FIG. 5 illustrates a method of using the apparatus of this invention in conjunction with two boats.

FIG. 5 shows another use of the of the shock absorber 270 of this invention in conjunction with a line 272. In this use a boat 276 is towing another boat 274 with a line 272 connected therebetween. The shock absorber 270 may be incorporated into the line 272 in similar fashion as has been described above.

Figure 6:
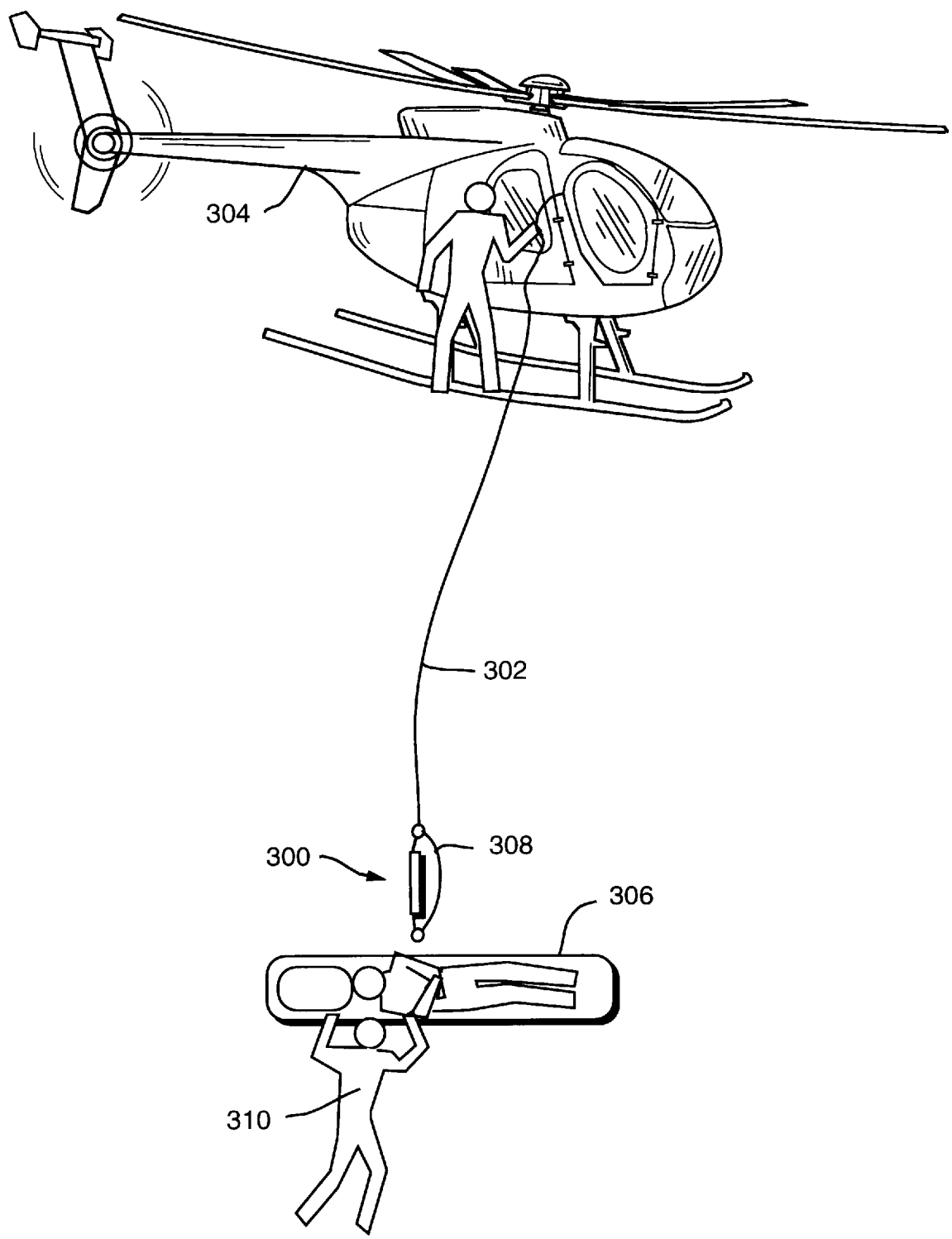
FIG. 6 illustrates a method of using the apparatus of this invention in conjunction with rescue lines.

FIG. 6 shows another use of the shock absorber 280 of this invention in conjunction with a tie down line 282. In this use an aircraft 284 is secured with a tie down line 282. This figure displays an alternative means of incorporating the shock absorber 280 into the tie down line 282. In this configuration the tie down line 282 is tied to the first receiving loop 286 and the second receiving loop 288. The portion 290 of the tie down line 282 which is located between the first receiving loop 286 and the second receiving loop 288 has some slack in it. The purpose of the slack is to allow the shock absorber 280 to expand in size to absorb the shock in the tie down line 282.

Figure 7:
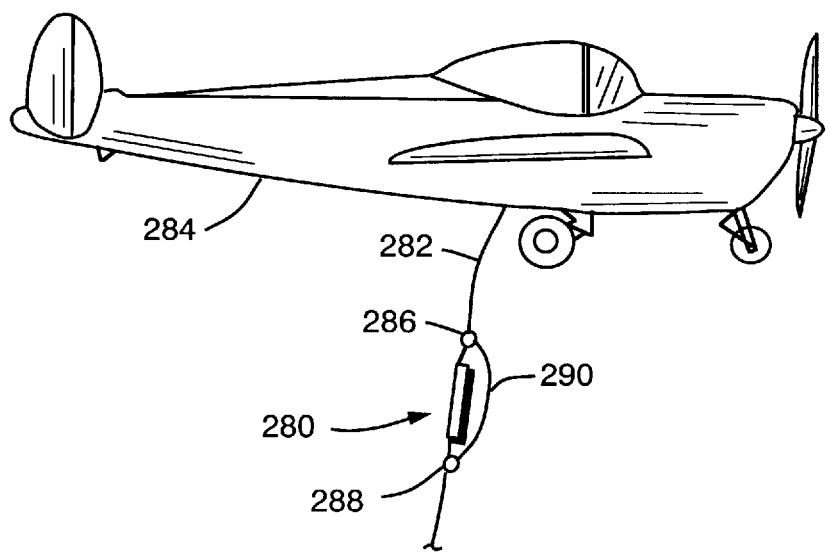
FIG. 7 illustrates a method of using the apparatus of this invention in conjunction with an aircraft.

FIG. 7 shows another use of the shock absorber 300 of this invention in conjunction with a rescue line 302, a helicopter 304 and a rescue basket 306. In this configuration, the rescue basket 306 is may be held steady by a rescuer 310, while the helicopter 304 is making movements caused by the wind or other like occurrences. The shock absorber 300 is incorporated into the rescue line with the use of a restriction tube 308 as described above. The restriction tube 308 ensures the integrity of the rescue line 302 in the event the shock absorber 300 should break.

Figure 8:
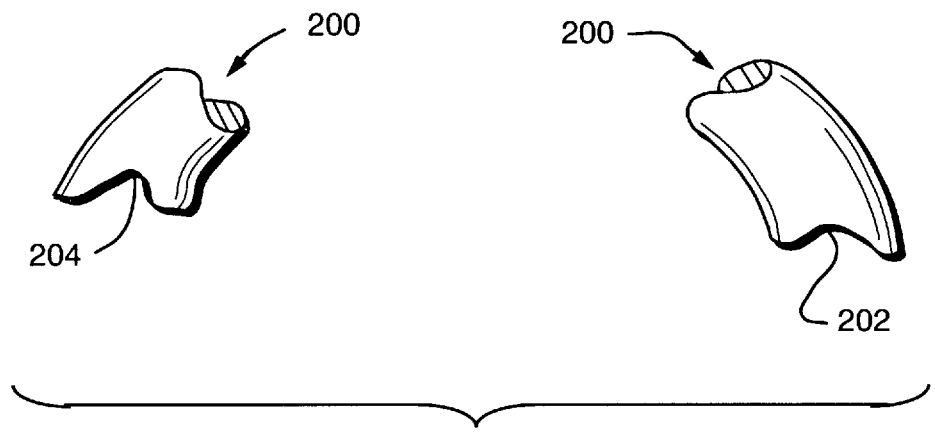
FIG. 8 is a view of an alternative end design to the restriction tube apparatus of this invention.

FIG. 8 shows an alternative design of the restriction tube 200 of this invention, in which a first notch 202 has been cut out of the first end of the restriction tube 200 and a second notch 204 has been cut out of the second end of the restriction tube 200. The purpose of the first notch 202 and second notch 204 is to allow the restriction tube 200 to securely grip the aforementioned line receiving means.

Figure 9:
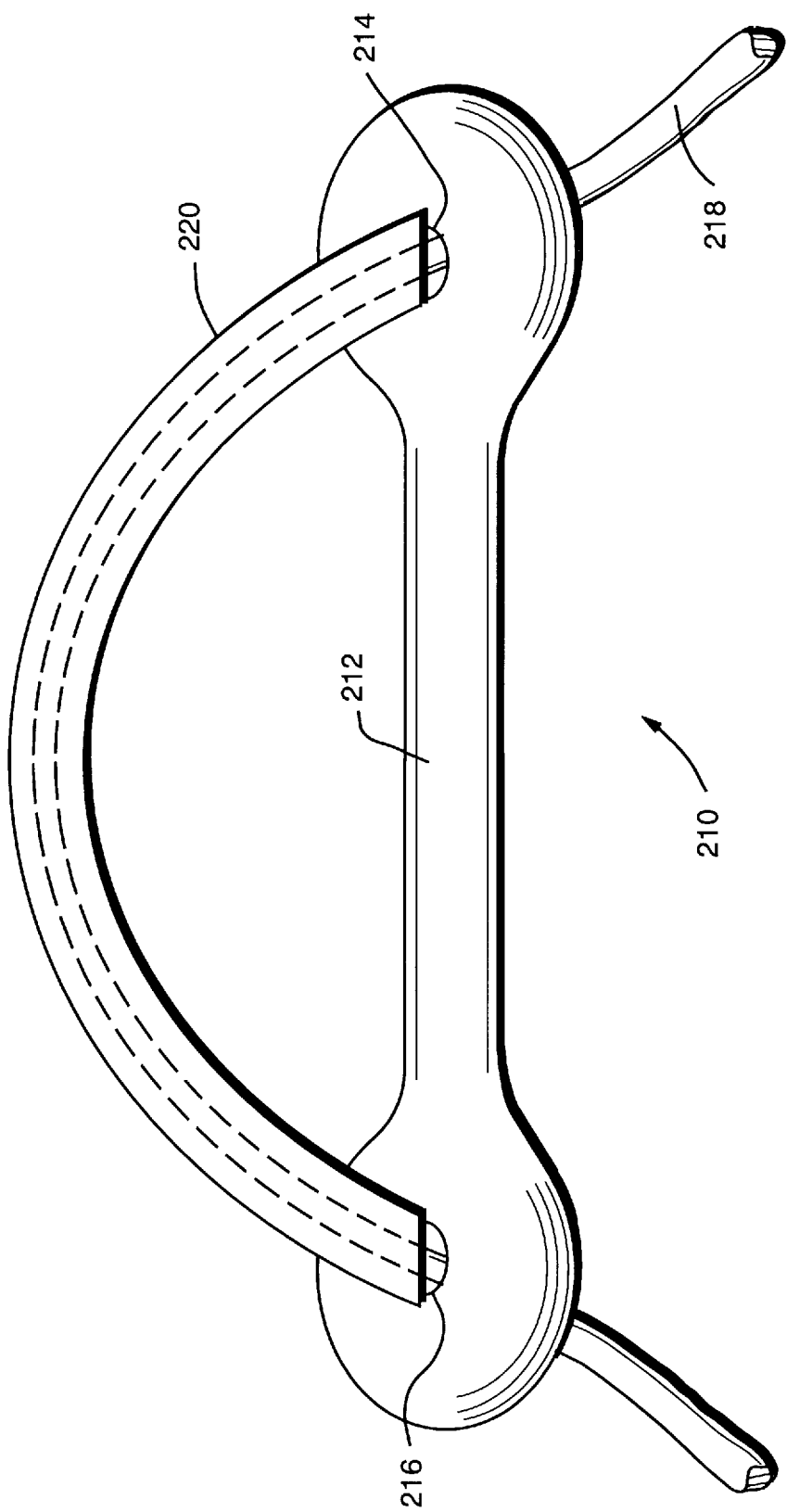
FIG. 9 illustrates a method, according to this invention, of using the restriction tube of this invention to incorporate another type of shock absorber into a line.

FIG. 9 shows a method of using the restriction tube 220 of this invention with a different shock absorber 210. The shock absorber is comprised of a resilient rubber element 212 with a first hole 214 and a second hole 216. The line 218 in which the shock absorber 210 will be incorporated, is passed through the first hole 214, then through the restriction tube 220 and finally back through the second hole 216. This allows for incorporating the shock absorber 210 into a line 218 without the need for tying knots in the line, and also facilitates the positioning of a predetermined amount of slack in the line 218 between the first hole 214 and the second hole 216, thereby setting a maximum amount of stretching which the shock absorber 210 will be allowed to perform.

Figure 10:
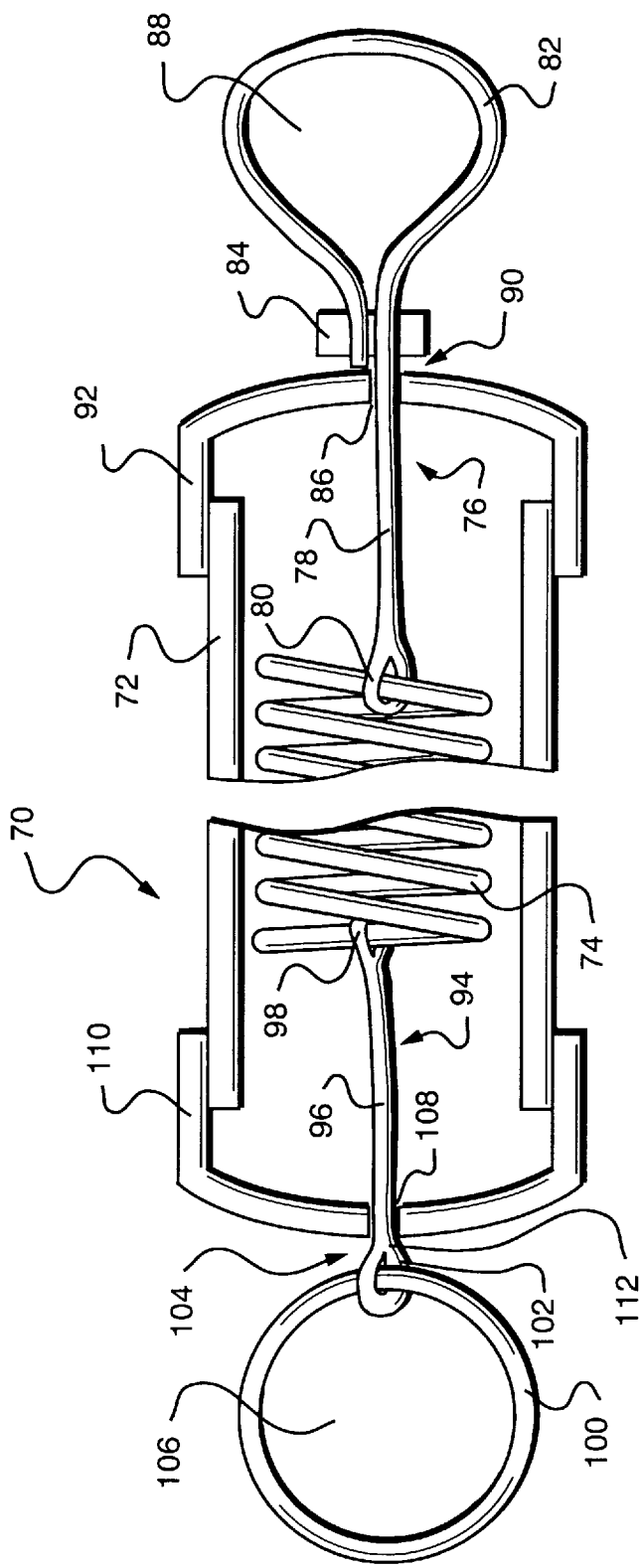
FIG. 10 is a side view, in partial cross section, of an alternative preferred embodiment of the apparatus of this invention.
Figure 12:
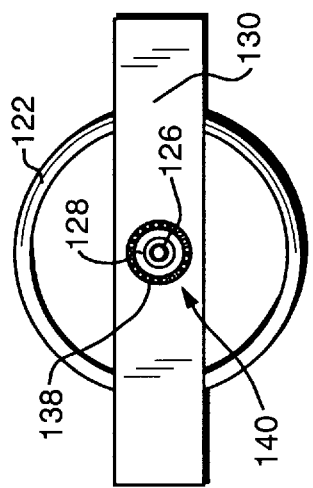
FIG. 12 is an end view of the apparatus shown in FIG. 11.
Figure 11:
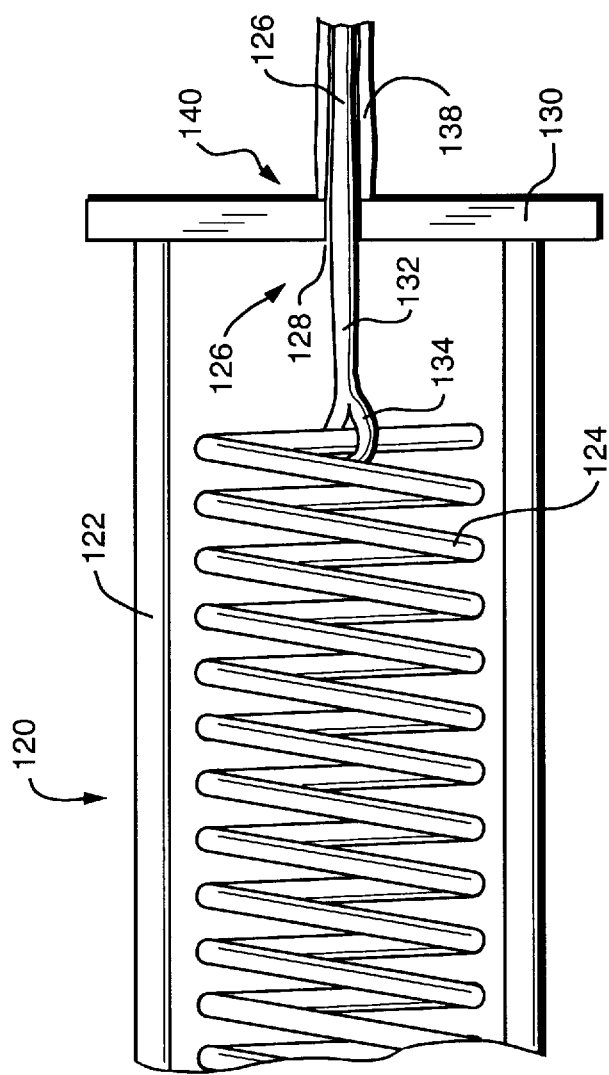
FIG. 11 is a partial side view depicting an alternative stop means for the apparatus of this invention.

FIGS. 10 through 12 show alternative preferred embodiments of the apparatus of this invention. FIG. 10 shows an alternative preferred embodiment of this invention in which the shock absorber 70 comprises a housing 72 inside of which is a spring 74. At the first end to the housing 72 is a first flexible cable 76 which has an inside portion 78 secured to the spring 74 by a coupling mechanism 80. The first flexible cable 76 passes through a hole 86 in a first end cap 92 positioned at the first end of the housing 72, thereby having a portion 82 of the first flexible cable 76 outside of the housing 72. The outside portion 82 of the first flexible cable 76 loops around and is secured to itself by a coupling mechanism 84. The outside portion 82 of the first flexible cable 76 thus defines a first receiving loop 88. The combination of the first end cap 92, the hole through the first end cap 86 and the coupling mechanism 84 form a first stop element 90 to prevent the outside portion 82 of the first flexible cable 76 from being pulled back into the housing 72 by the spring 74. At the second end to the housing 72 is a second flexible cable 94 which has an inside portion 96 secured to the spring 74 by a coupling mechanism 98. The second flexible cable 94 passes through a hole 108 in a second end cap 110 positioned at the second end of the housing 72, thereby having a portion 112 of the second flexible cable 94 outside of the housing 72. At the distal end of the outside portion 112 of the second flexible cable 94 is a means of coupling 102 a line receiving element 100 to the second flexible cable 94. The line receiving element 100 defines a second receiving loop 106. The combination of the second end cap 110, the hole through the second end cap 108 and the coupling mechanism 102 form a second stop element 104 to prevent the outside portion 112 of the second flexible cable 94 and the line receiving element 100 from being pulled back into the housing 72 by the spring 74.

FIGS. 11 and 12 show an alternative embodiment of the shock absorber of this invention. The shock absorber 120 comprises a housing 122 inside of which is a spring 124. Located at the end of the housing 122 is a flexible cable 126 which has a portion 132 inside the housing 122 and a portion 136 outside the housing 122. The portion 132 inside the housing 122 has a means of coupling 134 the flexible cable 126 to the spring 124. The flexible cable 126 passes through a hole 128 in an end plate 130 positioned at the end of the housing 122, the flexible cable 126 then continues outside of the housing thereby having a portion 136 outside of the housing 122. The end plate 130 must be sufficiently long to allow its ends to rest against the outside edges of the housing 122. The outside portion 136 of the flexible cable 126 is surrounded by a flexible sheath 138. One of the aforementioned line receiving means shall be positioned at the distal end of the flexible cable 126. The flexible sheath 136, end plate 130 and the hole 128 through the end plate 130 form a stop element 140 to prevent the outside portion 136 of the flexible cable 126 from being pulled back into the housing 122 by the spring 124.

Although specific features of this invention are shown in some drawings and not others, this is for convenience only as each feature may be combined with any or all of the other features in accordance with the invention Other embodiments will occur to those skilled in the art and are within the following claims:

What is claimed is:

1. An in-line shock absorbing device for use with a line, comprising:
    a housing with at least two ends;
    a resilient member within said housing;
    a first flexible cable coupled to a first end of said resilient member passing outside of said housing;
    a second flexible cable coupled to a second end of said resilient member passing outside of said housing;
    a first line-receiving means at a distal end of said first flexible cable, outside of a first end of said housing, for incorporating a first end of said shock absorbing device into said line with which said shock absorbing device will be used;
    a second line-receiving means at a distal end of said second flexible cable, outside of a second end of said housing, for incorporating the second end of said shock absorbing device into said line with which said shock absorbing device will be used;
    a first stop element at said first end of said housing defining an opening for said first flexible cable to pass through and prevent said first line-receiving means from being pulled into said housing by said resilient member, wherein said stop element includes a first sheath around said first flexible cable outside of said first end of said housing;
    a second stop element at said second end of said housing defining an opening for said second flexible cable to pass through and prevent said second line-receiving means from being pulled into said housing by said resilient member, wherein said stop element includes a second sheath around said second flexible cable outside of said second end of said housing;
    whereby said shock absorbing device is coupled to said line by said line-receiving means for incorporating said shock absorbing device into the line to provide shock absorption to the line.

2. The shock absorbing device of claim 1 in which said resilient member is a spring.

3. The shock absorbing device of claim 1 in which:
    said first sheath surrounds the entire portion of said first flexible cable which is outside of said housing; and
    said second sheath surrounds the entire portion of said second flexible cable which is outside of said housing.

4. The shock absorbing device of claim 1 in which:
    said first line-receiving means is a line receiving element, coupled to the distal end of said first flexible cable, defining an aperture for the line to pass through; and
    said second line-receiving means is a line receiving element, coupled to the distal end of said second flexible cable, defining an aperture for the line to pass through.

5. An in-line shock absorbing device for use with a line, comprising:
    an elongated housing with at least two ends;
    a first end covering, at a first end of said housing, with two holes therethrough;
    a second end covering, at a second end of said housing, with two holes therethrough;
    a resilient member within said housing;
    a first flexible cable passing out of said housing through one hole of said first end covering, and back into said housing through the other hole of said first end covering and coupled to said resilient member, thereby:
        forming a first receiving loop outside said housing and said first end covering as a first line-receiving means for incorporating said shock absorbing device into said line;
        forming a first securing loop inside said housing and said first end covering; and
        coupling said resilient member to said first receiving loop;
    a second flexible cable passing out of said housing through one hole in said second end covering, and back into said housing through the other hole of said second end covering and coupled to said resilient member, thereby:
        forming a second receiving loop outside said housing and said second end covering as a second line-receiving means for incorporating said shock absorbing device into said line;
        forming a second securing loop inside said housing and said second end covering; and
        coupling said resilient member to said second receiving loop;

a first sheath around the portion of said first flexible cable outside of said housing forming said first receiving loop, the width of said first sheath shall be larger than the width of the holes in said first end covering thereby preventing said first flexible cable from being pulled into said housing by said resilient member and defining a minimum length of said first receiving loop; and a second sheath around the portion of said second flexible cable outside of said housing forming said second receiving loop, the width of said second sheath shall be larger than the width of the holes in said second end covering thereby preventing said second flexible cable from being pulled into said housing by said resilient member and defining a minimum length of said second receiving loop;

whereby said shock absorbing device is coupled to said line by said line-receiving means to provide shock absorption to the line.

6. The shock absorbing device of claim 5 in which said covering at each end of said housing is an end cap.

7. The shock absorbing device of claim 5 further including a restraining loop passing through said first securing loop and passing through said second securing loop to limit the extension of said resilient member.

8. The shock absorbing device of claim 5 further including:

a line; and a restriction tube comprising a hollow flexible tube approximately slightly shorter than the distance between said first line-receiving means and said second line-receiving means when said resilient member is approximately fully extended;

whereby said line:
passes through said first line-receiving means;
then passes through said restriction tube; and
then passes through said second line-receiving means;

thereby obviating the need for tying knots in said line to incorporate said shock absorbing device into said line, and also providing for a predetermined amount of slack in said line between said first line-receiving means and said second line-receiving means.

9. An in-line shock absorbing device for use with a line, comprising:

an elongated housing with at least two ends;

a first end covering with two holes therethrough at a first end of said housing;

a second end covering with two holes therethrough at a second end of said housing:

a spring within said housing;

a first flexible cable passing out of said housing through one hole in said end covering, and back into said housing through the other hole of said first end covering and coupled to said spring, thereby:
forming a first receiving loop outside said housing and said first end covering for use as a first line-receiving means for incorporating said shock absorbing device into said line;
forming a first securing loop inside said housing and said first end covering; and
coupling said spring to said first receiving loop;

a second flexible cable passing out of said housing through one hole in said second end covering, and back into said housing through the other hole of said second end covering and coupled to said spring, thereby:
forming a second receiving loop outside said housing and said second end covering for use as a line-receiving means for incorporating said shock absorbing device into said line;
forming a second securing loop inside said housing and said second end covering; and
coupling said spring to said second receiving loop;

a restraining loop passing through said first securing loop and passing through said second securing loop to limit the extension of said spring;

a first sheath around the portion of said first flexible cable outside of said housing forming said first receiving loop, the width of said first sheath shall be larger than the width of the holes in said first end covering thereby preventing said first flexible cable from being pulled into said housing by said resilient member and defining a minimum length of said first receiving loop; and a second sheath around the portion of said second flexible cable outside of said housing forming said second receiving loop, the width of said second sheath shall be larger than the width of the holes in said second end covering thereby preventing said second flexible cable from being pulled into said housing by said resilient member and defining a minimum length of second receiving loop;

whereby said shock absorbing device is coupled to said line by said line-receiving means to provide shock absorption to the line.

10. The shock absorbing device of claim 9 in which said covering at each end of said housing is an end cap.

11. The shock absorbing device of claim 9 further including:

a line; and a restriction tube comprising a hollow flexible tube approximately slightly shorter than the distance between said first line-receiving means and said second line-receiving means when said resilient member is approximately fully extended;

whereby said line:
passes through said first line-receiving means;
then passes through said restriction tube; and
then passes through said second line-receiving means;

thereby obviating the need for tying knots in said line to incorporate said shock absorbing device into said line, and also providing for a predetermined amount of slack in said line between said first line-receiving means and said second line-receiving means.

12. The shock absorbing device of claim 11 which:

a first end of said restriction tube is cut at about a 15 to 75 degree angle, to allow said restriction tube to rest approximately flat against said line receiving means, thereby providing a more preferable surface to grip said line receiving means;

a second end of said restriction tube is cut at about a 15 to 75 degree angle, to allow said restriction tube to rest approximately flat against said line receiving means, thereby providing a more preferable surface to grip said line receiving means;

said first sheath has an expanded portion at the distal end of said first line-receiving means to provide a more preferable surface for resting against said first end of said restriction tube; and said second sheath has an expanded portion at the distal end of said second line-receiving means to provide a more preferable surface for resting against said second end of said restriction tube.

* * * * *